No. 693,950. Patented Feb. 25, 1902.
J. F. COOLEY.
ROTARY FLUID ENGINE.
(Application filed Aug. 7, 1901.)
(No Model.)
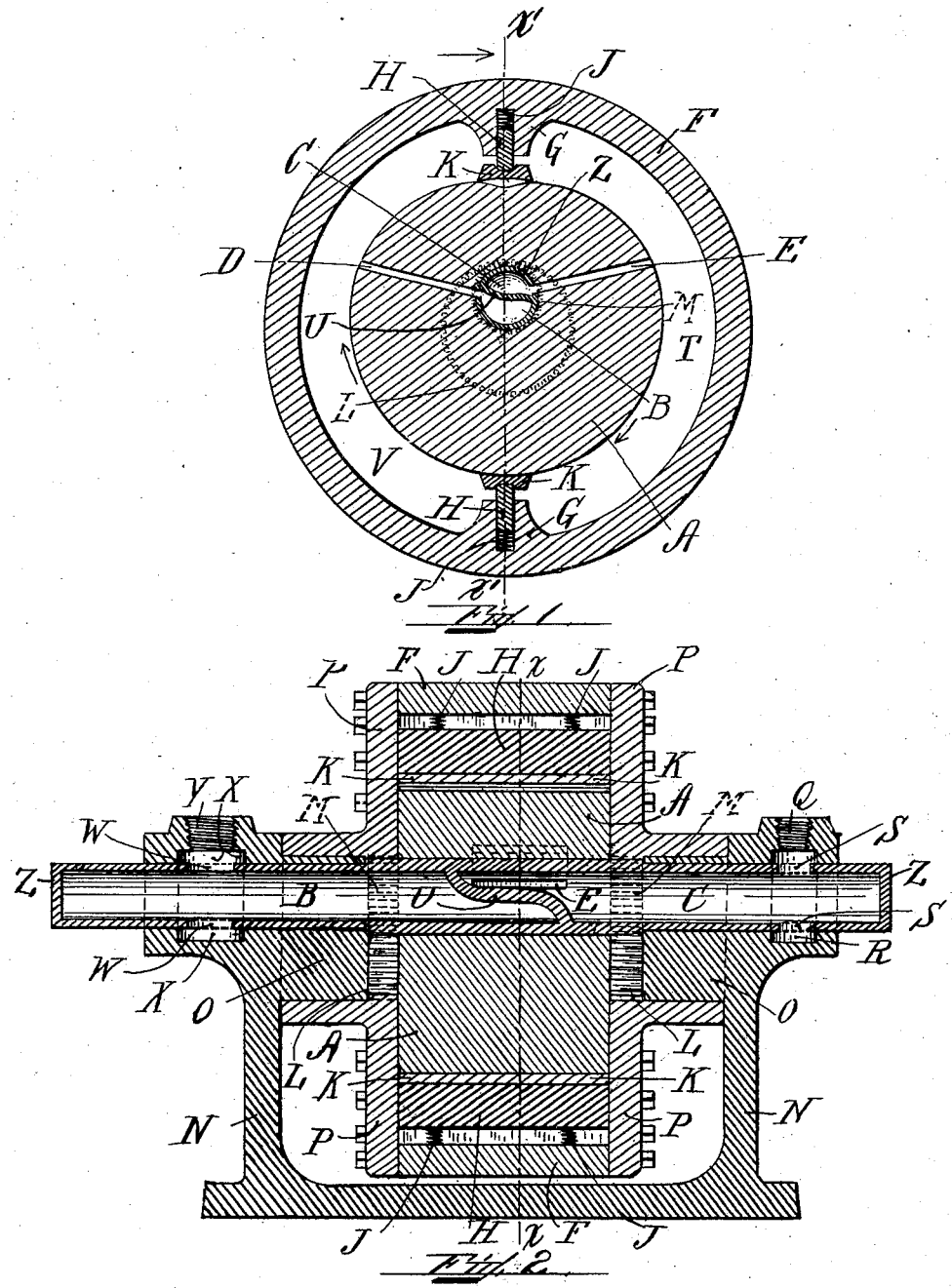

UNITED STATES PATENT OFFICE.

JOHN FRANCIS COOLEY, OF BOSTON, MASSACHUSETTS, ASSIGNOR TO COOLEY DEVELOPMENT COMPANY, OF SACO, MAINE, A CORPORATION OF MAINE.

ROTARY FLUID-ENGINE.

SPECIFICATION forming part of Letters Patent No. 693,950, dated February 25, 1902.

Application filed August 7, 1901. Serial No. 71,133. (No model.)

*To all whom it may concern:*

Be it known that I, JOHN FRANCIS COOLEY, of Boston, (Allston,) in the county of Suffolk and State of Massachusetts, have invented certain new and useful Improvements in Rotary Fluid-Engines, of which the following is a specification.

This my invention in its broad scope relates to the construction of rotary fluid-engines for propelling or being propelled by fluids—in other words, a rotary fluid-engine which may be operated by external devices to produce pressure in a fluid medium and, conversely, which may operate in consequence of pressure in a fluid medium to give motion to external devices. I found that when a point was revolving around and at a set distance from an axis at a given rate of movement upon a plane which revolved in like direction around an axis slightly offset from the axis of revolution of the point and with a comparative rate of revolution of the plane to the point, as two to one, three to two, four to three, &c., then the point delineated and circumscribed upon the plane epicycloidal or hypocycloidal forms, which might also be produced by the circle and point bearing disk of cyclometry. I noticed that the movement of two to one produced the well-known cardioid, the three to two a nephroid, &c., and I also found that the cardioid had two such points revolving at the same radial distance around the same axis which would describe the same epicycloidal curvilinear form at the same time and that the described bicuspid form (or nephroid) had three such points, the tricuspid had four, &c., and that if another circumscribed epicycloidal form was described whose cusps corresponded to these points upon these forms then their opposing lines or the axially longitudinal extensions thereof forming surfaces (which would be a condition of practice) would form partitioned spaces between their opposing surfaces, presenting conditions which, if inclosing a fluid under pressure on either side of a straight line drawn through the two axes, (supposing the ends to be properly closed by suitable end plates, preferably identified with one of the moving parts, and in close moving contact with the other,) then the fluid-pressure would cause a rotary movement of the first epicycloidal form, and the corresponding relative movement of the second epicycloidal form would follow, and if the first form were caused to move the second would follow and a pressure be exerted upon the fluid contained between the two forms and between the partitions, and the rate of the relative progression of the second form would be in the same ratio as the aforesaid generating-point would bear to the plane in producing the first form, which would be the epicycloidal form of the cardioid, bicuspid, tricuspid, &c., of this engine, and upon this I base my invention.

In practice my invention consists of the combined correlative construction and functions of two rotary and preferably cylindrical elements, a cycloidal cam-surface, and an abutment radially partitioned thereon of equal length, one within the other, suitably bounded by parallel planes, each part rotating in the same direction, one in moving contact with the other at the extremities of said partitions, which have common radial and mutually equal cyclic distances moving at a relatively constant rate of speed differing by unity, each upon an axis which is independent of the other and at a slight predetermined distance or offset therefrom, but parallel therewith and of unchanging location, assured by suitable attached axles or bearing-surfaces in fixed bearings, wherein the correlative surface of the cam is described by the said partition extremities of the other element, producing circumscribed epicycloidal or hypocycloidal cam forms or modifications thereof, the abutment-partitioning and slowly-moving element possessing numerically one more bearing-point than the cam-surface element has rises and a means for fluid entrance and exit to and from the spaces between them so formed. The part with the partition-bearing points would perform the function of a partitioning and spacing device, determining by the distance between its points, which bear and move upon the opposing lateral surfaces of the other part, the peripheral extent over which and by its relative movement the directions from which mutual surface abutment exists with reference to any therein inclosed fluid. This piece herein is called a "spacer," because it spaces off the peripheral surfaces of the piston. The other piece, whose lateral surfaces oppose the spacer and support the moving contact of the bearing-points thereof, is herein called a "piston." The spacer is preferably cylindroid, with projecting partitions; but the lateral surfaces of the piston upon which the other edge of the partitions contiguously moves must be of epicycloidal or hypocycloidal generation, and to it or from it power should be transmitted, preferably, through one or two suitable axial extensions. It is also preferable to close the ends of the moving parts by identifying suitable disks therewith at each end on one of the moving parts, so that they may revolve therewith in close moving contact with the other moving part, and when the disks are so identified with one of the parts, especially when that part is the spacer, it is preferable to provide bearing-surfaces on the disk for the support of the spacer, making and providing a central opening in the disk large enough to allow the movement of the piston-shaft therein, and it is also found necessary, especially in the simplest form of piston, as illustrated in the drawings, to have gear-teeth in the said openings of the disk, and also upon the shaft or on a form attached thereto, or otherwise identified with each element, so that they may engage with each other and insure unchanging correlative movement between the spacer and the piston.

The essence of this invention lies in the correlative construction and functional operation of a slowly-rotating cylindrical equiradially-partitioned abutment element, whose divisional limitations bear upon a like-directionally faster-rotating cylindrical cam-surface-piston element, the curves of which they describe in their movement around their common axis set eccentrically to the axis of rotation of the cam-surface element, when caused to move at correlative speed rates that reckoned in complete revolutions of both elements differ by unity, and the number of bearing-points of the one are to the number of cam rises of the other as the converse of their speed rates.

My invention consists of certain novel features hereinafter described, and particularly pointed out in the claims.

In the accompanying drawings, which illustrate a construction embodying my invention using the cardioid piston, Figure 1 is a cross-sectional view on the line $aa$, Fig. 2. Fig. 2 is a longitudinal sectional view on the line $a'a'$, Fig. 1.

Like letters of reference refer to like parts throughout both views.

A represents a one-rise cam-surface piston provided with a hollow shaft Z, divided by a partition U into chambers B and C, and communicating with said chamber B is a port D, and communicating with the chamber C is a port E. Located around said piston is the spacer F, provided with two internally-projecting partitions G G, in the extremities of each of which are wearing take-up devices, which are adapted to move radially, the adjustable spline H bearing against the rocking shoes K in contact with and partitioning or spacing the surface of the piston A, and said splines are self-adjusting by means of the springs J. Located on the shaft is the gear M, which meshes with the gear L, which, as shown in the drawings, (dotted lines, Fig. 2, and partly in full lines, Fig. 1,) is provided in each end plate P, which are secured by suitable bolts to the spacer F. The lugs O O provide positionally-fixed eccentric parallel bearings for both spacer and piston, as shown, on the supports N. Fluid may enter through the opening Q into the annular space R, thence through the two openings S into the chamber C of the hollow shaft Z, thence through the port E into the space T between the spacer and the piston, and when said fluid is under pressure therein and this engine is operated as a motor the fluid presses upon the spacer F over the surface limited by the partitions G G and reacts upon the piston A between the said partitions G G. The preponderance of the piston-surface being below the axis of the shaft Z, a rotary movement is induced by said fluid-pressure in the direction of the arrow, Fig. 1, and the gear M, intermeshing with the gear L, causes a like directional rotation of the spacer F in the angular velocity ratio of two of the piston to one of the spacer, computed in complete revolutions of both parts. When the piston A has revolved in the direction of the arrow until a diametrically opposite position of the piston has been reached to that shown in Fig. 1, then the spacer F will occupy a position in which the vartitions G G will stand at right angles to their position shown in Fig. 1, and the rocking shoes K K will then stand directly over the ports D and E. The bulk of the piston (shown in Fig. 1 as being below the ports D and E) will then occupy a portion of the space T, and that portion shown above the said ports will then occupy a portion of the space V. With the cardioid piston in this correlative position of the parts, with the engine operating as a motor, it would be upon a dead-center and would consequently have to rely upon the momentum of the parts or external force to carry the rocking shoes K past the ports D and E, which when accomplished will allow of the entrance of the fluid through the port E into the space V, in which location of the partitions to the piston the preponderance of the surface of the piston A exposed to the fluid-pressure would be eccentric to the center of revolution of the divided shaft Z or tangential thereto, causing rotation, as before, in the direction of the arrow.

At the beginning of the rotary operation of the parts, as hereinbefore described, the space V between the spacer F and piston A may be occupied by the fluid medium, in which case the movement of the parts, as described, would cause a pressure therein which would find outlet through the port D into the chamber B and thence through the openings W W into the annular space X and out through the opening Y in the support M. Power may be communicated to or taken from the shaft Z by any suitable driving-pulley or other device.

The mechanical movement disclosed in this application is not claimed herein, but forms the subject-matter of another application filed by me January 17, 1902, Serial No. 90,116.

A multiplicity of cam-rises with the corresponding multiplicity of spacer-bearing points thereon are within my invention.

I do not limit myself to the arrangement and construction shown, as the same may be varied without departing from the spirit of my invention.

Having thus described the nature of my invention and set forth a construction embodying the same, what I claim as new, and desire to secure by Letters Patent of the United States, is—

1. In a rotary fluid-engine, a rotary piston, a rotary spacer having fixed partitions bearing on the peripheral curved surfaces of the piston, both piston and spacer mounted on different axes of rotation and rotating in the same direction at relatively constant but different rates of speed, and means for entrance and exit of fluid.

2. In a rotary fluid-engine, a rotary spacer provided with fixed bearing-points, a rotary piston whose curved peripheral surfaces are partitioned off by said spacer and which is in continuous contact with said bearing-points, both spacer and piston rotating in the same direction at relatively constant but different rates of speed, and means for entrance and exit of fluid.

3. In a rotary fluid-engine, a rotary spacer provided with fixed equidistant bearing-points, a rotary piston whose curved peripheral surfaces are partitioned off by said spacer and form with it separate fluid-divisions and which is in continuous contact with said bearing-points, both spacer and piston rotating in the same direction at relatively constant but different rates of speed, and means for entrance and exit of fluid.

4. In a rotary fluid-engine, a rotary spacer provided with fixed bearing-points, a rotary piston whose curved peripheral surfaces are partitioned off by said spacer and which is in continuous contact with said bearing-points, both spacer and piston mounted on different axes of rotation and rotating in the same direction at relatively constant but different rates of speed, and means for entrance and exit of fluid.

5. In a rotary fluid-engine, a rotary spacer provided with fixed equidistant bearing-points, a rotary piston in continuous contact with said bearing-points and forming separate fluid-divisions and located eccentrically to said spacer, both piston and spacer rotating in the same direction at relatively constant but different rates of speed, and means for entrance and exit of fluid.

6. In a rotary fluid-engine, a rotary spacer provided with fixed equidistant bearing-points, a rotary piston in continuous contact with said bearing-points and forming separate fluid-divisions and located eccentrically to said spacer, both piston and spacer rotating in the same direction at relatively constant but different rates of speed—the speed of the piston exceeding the speed of the spacer by such an amount that the terms of their ratio when reduced to their lowest integral numbers differ by unity—and means for entrance and exit of fluid.

7. In a rotary fluid-engine, an axially-rotating cylindrical hollow spacer provided at equal distances upon its inner surface with fixed equidistant bearing-points, a rotary cylindroid piston in continuous contact with said bearing-points and provided with an axis parallel to the axis of said spacer and rotating in the same direction as the spacer at a relatively constant but different rate of speed, which speed of the piston exceeds that of the spacer by such an amount that the terms of their ratio when reduced to their lowest integral numbers differ by unity, and means for entrance and exit of fluid.

8. In a rotary fluid-engine, the combination of two like directional rotary elements caused to move one within the other on parallel fixed axes, at correlatively constant speed rates differing by such an amount that the terms of their ratio when reduced to their lowest integral numbers differ by unity, the element of slow speed having fixed projections whose extremites form bearing-points at equal radial distances from its axis and equally spaced along their circular path of travel, and moving in continuous contact with the element of higher speed whose correlative curved surface is formed to correspond to the path of said extremities, and means for entrance and exit of fluid to and from the partitioned spaces.

9. In a rotary fluid-engine, the combination of two like directional rotary elements caused to move one within the other on parallel fixed axes at correlatively constant speed rates differing by such amount that the terms of their ratio when reduced to their lowest integral numbers differ by unity, the element of slow speed having fixed projections whose extremities form bearing-points at equal radial distances from its axis and equally spaced along their circular path of travel and moving in continuous contact with the element of higher speed, whose curved surface is formed to correspond to the path of said extremities when their number equals the greater of the two terms of the correlative speed ratio when expressed in their smallest integral numbers, means for entrance and exit of fluid, and end plates fastened to one element and contiguous to the other.

10. In a rotary fluid-engine, the combination of two like directional rotary elements caused to move one within the other on parallel positionally-fixed axes at correlatively constant speed rates differing by such an amount that the terms of their ratio when reduced to their lowest integral numbers differ by unity, the element of slow speed having fixed projections whose extremities form bearing-points at equal radial distances from its axis and equally spaced along their circular path of travel, and moving in continuous contact with the element of higher speed whose correlative curved surface is formed to correspond to the path of said extremities when their number equals the greater of the two terms of the correlative speed ratio when expressed in their smallest integral numbers, means for entrance and exit of fluid, end plates fastened to one element and contiguous to the other, and each element provided with geared surfaces which mutually intermesh.

11. In a rotary fluid-engine, the combination of two like directional rotary elements caused to move one within the other on parallel positionally-fixed axes at correlatively constant speed ratios differing by such an amount that the terms of their ratio when reduced to their lowest integral numbers differ by unity, the element of slow speed having fixed projections whose extremities are armed with adjustable wearing-shoes which form bearing-points at equal radial distances from its axis and equally spaced along their circular path of travel and moving in continuous contact with the element of higher speed whose correlative curved surface is formed to correspond to the path of said shoes when their number equals the greater of the two terms of the correlative speed ratio when expressed in their smallest integral numbers, means for entrance and exit of fluid, end plates fastened to one element and contiguous to the other, and each element provided with geared surfaces which mutually intermesh.

12. In a rotary fluid-engine, a rotary piston, a rotary spacer with fixed projections for partitioning off the peripheral curved surfaces of the piston, both piston and spacer mounted on different axes of rotation and rotating in the same direction at relatively constant but different rates of speed, a hollow shaft through which is effected the entrance and exit of the fluid.

13. In a rotary fluid-engine, a rotary piston, a rotary spacer with fixed projections for partitioning off the peripheral curved surfaces of the piston and surrounding the piston, both piston and spacer mounted on different axes of rotation and rotating in the same direction at relatively constant but different rates of speed, and means for entrance and exit of fluid.

14. In a rotary fluid-engine, a rotary piston, a rotary spacer with fixed projections for partitioning off the peripheral curved surfaces of the piston and surrounding the piston, both piston and spacer mounted on different axes of rotation and rotating in the same direction at relatively constant but different rates of speed, a hollow shaft upon which the projection is mounted and through which is effected the entrance and exit of the fluid.

In testimony whereof I have signed my name to this specification, in the presence of two subscribing witnesses, this 5th day of August, A. D. 1901.

JOHN FRANCIS COOLEY.

Witnesses:
A. L. MESSER,
C. A. STEWART.